(No Model.)

J. B. HOUSTON.
PISTON ROD PACKING.

No. 488,434. Patented Dec. 20, 1892.

Witnesses:
E. A. Brandau
Wilson D. Bent Jr.

Inventor:
John B. Houston
By his atty,
John Richards

UNITED STATES PATENT OFFICE.

JOHN B. HOUSTON, OF SAN FRANCISCO, CALIFORNIA.

PISTON-ROD PACKING.

SPECIFICATION forming part of Letters Patent No. 488,434, dated December 20, 1892.

Application filed March 15, 1892. Serial No. 424,994. (No model.)

*To all whom it may concern:*

Be it known that I, JOHN B. HOUSTON, a citizen of the United States, residing in the city and county of San Francisco, State of California, have invented certain new and useful Improvements in Piston-Rod Packing; and I hereby declare the following specification, with the drawings therewith, to be a full, clear, and exact description of my invention.

My invention relates to what is called, metallic piston rod packing, in which a steam joint is maintained around the piston and valve rods of steam or other vapor engines, without the use of fibrous or other perishable material.

My invention consists in the usual divided and flexible packing rings, bearing upon the piston rod, and outside of, or around these, a continuous corrugated ring, that gives equal pressure at close points or intervals of space around the packing rings. These corrugated rings, having cut on their outside, beveled faces, on which bear corresponding bevel faces of a wedge ring, that by adjustment imparts and regulates equal pressure on the inner or bearing packing rings.

My invention also includes, the application of such packing at one or two points in the same packing box, and in the various mechanical details required to adjust and regulate the corrugated rings and their pressure on the packing rings.

Figure 1:
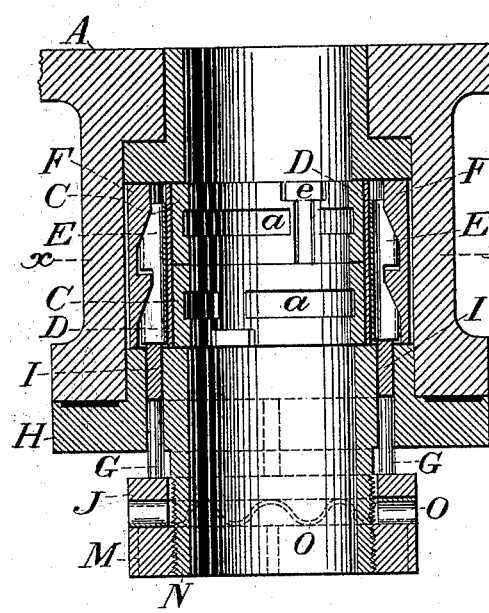
Figure 3:
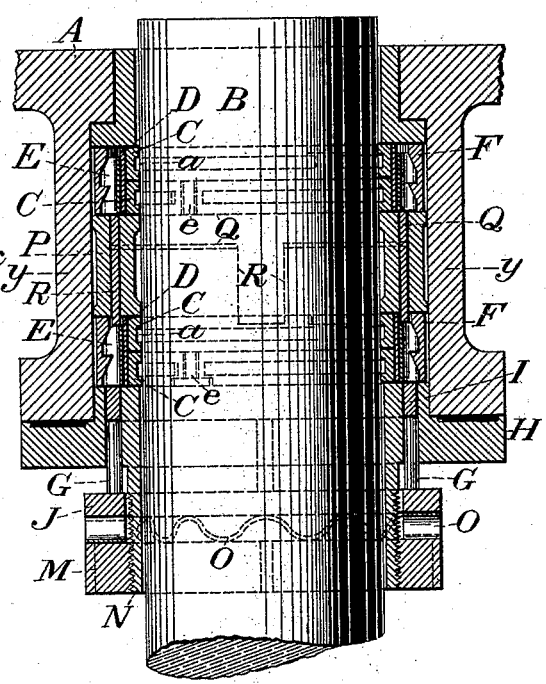
Figure 2:
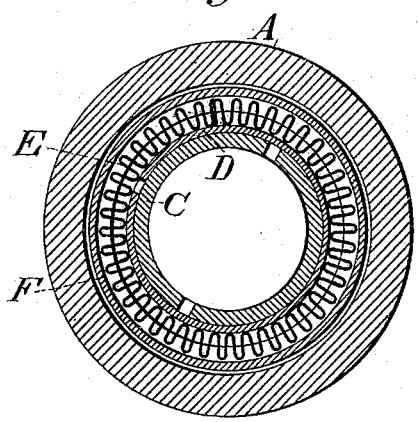
Figure 4:
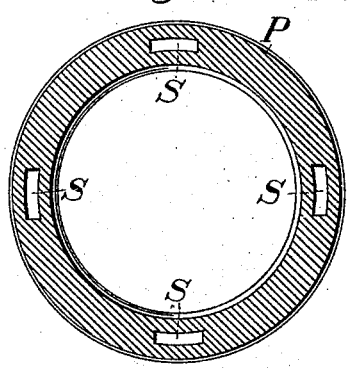

Referring to the drawings: Figure 1 is a central longitudinal section through a piston packing, made according to my improvements, the piston rod being in this case not shown. Fig. 2 is a transverse section on the line $x\ x$ of Fig. 1 showing the shape of the corrugated ring that compresses the packing rings. Fig. 3 shows a similar packing arranged in two sections or parts as it is applied to larger engines and piston rods. Fig. 4 is a partial section on line $y\ y$ of Fig. 3, showing the form of the distance piece between the outer and inner sets of packing rings, and slots for adjusting the inner corrugated ring.

Similar letters of reference on the different figures of the drawings indicate corresponding parts.

Referring now to the various parts, A is the stuffing box or sleeve to contain the packing. This can be formed integrally with a steam engine cylinder, or be bolted on separately, as its size, or convenience may demand.

B is the piston rod, shown in Fig. 3, and omitted in Fig. 1.

C C are packing rings in contact with the piston rod, preferably made with recesses or grooves $a$ on their inner faces, as shown in the drawings. The joint in these rings is closed by a check piece $e$ in the usual manner. Surrounding these packing rings C C, are thin bands or collars D, interposed between the packing rings and the corrugated rings E.

The corrugated rings E are formed of thin metal as shown in Figs. 2 and 4, so as to impart a degree of elasticity, and around their exterior are cut beveled grooves or faces as shown in the sections, Figs. 1 and 3. Fitting into these grooves in the corrugated rings are corresponding beveled faces on an outer ring F, so that when the corrugated rings E are moved outward, or inward, in the line of the piston rod's axis, the corrugated rings E are correspondingly expanded or compressed in diameter, and when moved inward bear with increased force on the collars D, and consequently on the inner or main packing rings C C.

To operate the wedge rings F, I employ three or more studs G, fitting through corresponding holes in the plates H, and bearing upon a collar I, embedded loosely in that plate. This collar I bears all around on the bottom of the corrugated rings E. The studs G are moved inward by the follower ring J and the screw collar M, as shown in Figs. 1 and 3. The loose or follower collar J, on which the studs G rest, slides freely over the nipple N, on which is screwed the collar M, and between these two collars I place a wave shaped spring O, which imparts elasticity in the adjustment of the various parts.

In Fig. 3 the construction is the same, except that two sets of packing rings are applied instead of one. This construction I prefer in the case of large engines, or when the stuffing boxes are of considerable length. To move and adjust the inner or upper set of rings E, there is required in addition to the collars J and M, and the studs G, a distance piece P, shown in Fig. 3. This distance piece P is grooved around its top to receive a collar Q, which is deep enough in its annular section to give stiffness, and then is cut away to form legs or projections R, corresponding in number to the studs G. These projections R pass down through holes S, as shown in Fig. 4, and bear upon the outer corrugated rings E, so that whatever pressure is applied by the studs G and the collar I to the first ring E, is communicated with equal force to the second or inner ring E, so that these two rings are alike in construction, functions, and adjustment, constituting, as aforesaid, a double set of the packing elements, as shown in Fig. 1. The outer rings F are made smaller in diameter than the internal bore of the main stuffing box A, so the packing, as a whole, can move laterally to accommodate any deviation of the piston rod B.

Having thus explained the nature and objects of my invention, what I claim as new and desire to secure by Letters Patent, is—

1. In a piston rod packing, split packing rings embracing the piston rod at two or more points, around these corrugated or wave like springs as herein described, with angular grooves or beveled faces transverse to the corrugations and bearing upon correspondingly fixed beveled faces on the outside of the corrugated rings, so as to produce compression of the packing by adjustment of the latter; a bearing ring beneath or at the end of the corrugated one, and pressing stems to act thereon from the outside, in the manner substantially as and for the purposes specified.

2. In a piston-rod packing, split packing rings, embracing the rod at two or more points, surrounding these rings, a thin collar, and, outside of this, a corrugated ring having on its outer face a groove with beveled sides. Wedge rings having reversed grooves of similar form so the beveled faces of the two will produce lateral adjustment of the rings as they are moved outward or inward, thus producing an equal pressure on the packing rings around the piston rod, uniformly and at a number of points, in the manner, substantially, and for the purposes specified.

3. In a piston-rod packing, one or more split packing rings embracing the piston rod, corrugated rings as herein described, embracing and bearing upon the packing rings. A wedge collar with beveled faces placed around and acting on the rings, as the latter are adjusted inward or outward in the line of the piston rod; sliding stems passing in from the exterior, operated by a screw collar, and bearing at several points on the rings, so the latter can be adjusted while the piston rod is in motion, in the manner substantially and for the purposes described.

4. In a piston-rod packing, split packing rings surrounding and bearing upon the piston rod; adjustable corrugated rings bearing thereon, as herein described, a ring bearing upon and adjusting the rings in the line of the piston rod's movement; studs extending out to the exterior of the packing box, and operated by a screw collar that moves the studs uniformly so adjustment can be made while the piston rod is in motion, in the manner, substantially, and for the purposes specified.

5. In a piston-rod packing, a corrugated ring having beveled ledges or grooves on its exterior, a corresponding ring surrounding the same, having like beveled grooves or ledges, studs and intermediate rings or collars between the studs and the corrugated ring, a screw collar, and a sliding one with a wave spring interposed, the whole combined and operating in the manner, substantially as described and for the purposes specified.

In testimony whereof I have hereunto affixed my signature in the presence of two witnesses.

JOHN B. HOUSTON.

Witnesses:
ALFRED A. ENQUIST,
WILSON D. BENT, Jr.